United States Patent
Khodorkovsky et al.

(10) Patent No.: US 8,943,347 B2
(45) Date of Patent: Jan. 27, 2015

(54) CONTROLLING THE POWER STATE OF AN IDLE PROCESSING DEVICE

(75) Inventors: Oleksandr Khodorkovsky, Toronto (CA); Paul Blinzer, Bellevue, WA (US); Korhan Erenben, Mississauga (CA); Leonard Martin Berk, Toronto (CA); Min Zhang, Richmond Hill (CA)

(73) Assignees: Advanced Micro Devices, Inc., Sunnyvale, CA (US); ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 13/439,569

(22) Filed: Apr. 4, 2012

(65) Prior Publication Data
US 2012/0249559 A1   Oct. 4, 2012

Related U.S. Application Data

(63) Continuation-in-part of application No. 12/713,935, filed on Feb. 26, 2010, now Pat. No. 8,316,255.

(60) Provisional application No. 61/240,876, filed on Sep. 9, 2009.

(51) Int. Cl.
  *G06F 1/00* (2006.01)
  *G06F 1/32* (2006.01)
  (Continued)

(52) U.S. Cl.
  CPC .............. *G06F 1/3203* (2013.01); *G06F 1/325* (2013.01); *G06F 1/3275* (2013.01); *G06F 1/3287* (2013.01); *G09G 3/003* (2013.01); *G09G 5/363* (2013.01); *G09G 2330/021* (2013.01); *G09G 2360/06* (2013.01); *Y02B 60/1225* (2013.01); *Y02B 60/1282* (2013.01)

USPC ........... 713/324; 713/300; 713/310; 713/320; 713/323

(58) Field of Classification Search
CPC ....... G06F 1/3203; G06F 1/32; G06F 1/3287; G06F 3/1221; Y02B 60/121; Y02B 60/1278
USPC .......................... 713/300, 310, 320, 323, 324
See application file for complete search history.

(56) References Cited

U.S. PATENT DOCUMENTS

| 5,848,281 | A | 12/1998 | Smalley et al. |
| 6,131,167 | A | 10/2000 | Cruz |
| 6,618,791 | B1 | 9/2003 | Dodd et al. |

(Continued)

FOREIGN PATENT DOCUMENTS

| EP | 2 079 015 A1 | 7/2009 |
| WO | WO 00/65428 A1 | 11/2000 |

(Continued)

OTHER PUBLICATIONS

Search Report and Written Opinion for International Application No. PCT/US2010/048096 mailed Dec. 29, 2010, 14 pages.

*Primary Examiner* — Jaweed A Abbaszadeh
(74) *Attorney, Agent, or Firm* — Volpe and Koenig, P.C.

(57) ABSTRACT

A method of operating a processing device is provided. The method includes, responsive to an idle state of the processing device, transitioning the processing device to a substantially disabled state. The processing device, for example, may be a graphics processing unit (GPU). Transitioning the processing device to a substantially disabled state upon detection of an idle state may result in power savings. Corresponding systems and computer program products are also provided.

18 Claims, 13 Drawing Sheets

(51) Int. Cl.
*G09G 3/00* (2006.01)
*G09G 5/36* (2006.01)

(56) References Cited

U.S. PATENT DOCUMENTS

| | | | |
|---|---|---|---|
| 7,032,120 B2 * | 4/2006 | El-Kik et al. | 713/320 |
| 7,256,788 B1 * | 8/2007 | Luu et al. | 345/501 |
| 7,577,877 B2 * | 8/2009 | Emerson et al. | 714/43 |
| 7,581,129 B2 * | 8/2009 | Samson et al. | 713/323 |
| 7,636,863 B2 | 12/2009 | Oh | |
| 7,730,336 B2 * | 6/2010 | Marinkovic et al. | 713/320 |
| 7,755,779 B2 * | 7/2010 | Miura et al. | 358/1.13 |
| 7,779,191 B2 * | 8/2010 | Lu et al. | 710/262 |
| 7,782,313 B2 * | 8/2010 | Lin et al. | 345/211 |
| 7,890,780 B2 | 2/2011 | Golasky et al. | |
| 8,006,106 B2 * | 8/2011 | Sun | 713/300 |
| 8,161,304 B2 | 4/2012 | Hamilton | |
| 8,635,480 B1 * | 1/2014 | Mimberg et al. | 713/324 |
| 2004/0083396 A1 * | 4/2004 | Perahia | 713/300 |
| 2005/0250452 A1 | 11/2005 | Walton et al. | |
| 2005/0268141 A1 * | 12/2005 | Alben et al. | 713/500 |
| 2005/0289377 A1 * | 12/2005 | Luong et al. | 713/322 |
| 2007/0283175 A1 * | 12/2007 | Marinkovic et al. | 713/320 |
| 2008/0100636 A1 * | 5/2008 | Lai et al. | 345/546 |
| 2008/0168285 A1 * | 7/2008 | de Cesare et al. | 713/320 |
| 2008/0235527 A1 | 9/2008 | Heller et al. | |
| 2009/0063791 A1 | 3/2009 | Cho | |
| 2009/0204831 A1 | 8/2009 | Cousson | |
| 2010/0064160 A1 | 3/2010 | Wilson et al. | |
| 2010/0218011 A1 | 8/2010 | Diab et al. | |
| 2011/0029694 A1 * | 2/2011 | Blinzer | 710/9 |

FOREIGN PATENT DOCUMENTS

| | | |
|---|---|---|
| WO | WO 2007/140404 A2 | 12/2007 |
| WO | WO 2009/038902 A1 | 3/2009 |

\* cited by examiner

CONTROLLING THE POWER STATE OF AN IDLE PROCESSING DEVICE

CROSS REFERENCE TO RELATED APPLICATIONS

This application is a continuation-in-part of U.S. patent application Ser. No. 12/713,935, filed Feb. 26, 2010, now U.S. Pat. No. 8,316,255 which claims the benefit under 35 U.S.C. §119(e) of U.S. Provisional Appl. No. 61/240,876, filed Sep. 9, 2009. U.S. patent application Ser. No. 12/713,935 and U.S. Provisional Appl. No. 61/240,876 are both incorporated by reference herein in their entireties.

BACKGROUND

1. Field of the Invention

The present invention is related to saving power in computer systems.

2. Background

Many systems include a specialized processing device, such as, for example, a graphics processing unit (GPU), in addition to a central processing unit (CPU). Some processing systems include multiple of these specialized processing devices to allow for performance gains through parallel processing of tasks. Exemplary tasks may include, for its example, video processing, graphics processing, physics simulations and the like. A graphics-intensive game may be running that requires or can benefit from having the additional processing power provided by multiple active GPUs. Other applications, however, may not benefit from such increased processing power. When only these other applications are being run on the system, the active available graphics processing power may be reduced This can be accomplished by reducing the number or GPUs or by switching from one GPU to another with lower capabilities.

GPUs are typically coupled to a central processing unit (CPU) through a bus, e.g., a peripheral component interconnect (PCI) or PCI express bus and may be included in another device (e.g., a northbridge device). Alternatively, a GPU or other type of core or processor may be included as part of the same package or same die as a CPU An operating system, running on a CPU, usually checks device presence on the bus. When a device does not respond to the configuration cycles, e.g., when the device is turned off, the operating system can cause complex processes (e.g., plug-and-play processes) to be executed that can have negative effects on the user experience. Thus, powering on and off devices is often operating system dependent. To prevent these negative effects, many graphics systems keep GPUs powered (even those that are not being used) so that they can respond to configuration cycles generated by the CPU. Keeping unused GPUs powered, however, can result in inefficient power usage and, in mobile systems, decreased battery life.

Improvements in power consumption can be achieved by shutting down one or more processing devices when multiple of a particular type of processing device are available in a system. Secondary processing devices that are shutdown can remain in that state as long as the primary processing device of that type can service the workload in the system. However, when the primary one of a particular type of processing devices is shutdown during an idle period, more complexities arise. For example, for a primary processing device of a particular type, it is challenging to determine when that device has been idle for a long enough duration so as to efficiently cause it to shutdown, as well as to enable the system to reactivate that device for any new work that requires the type of processing performed by processing devices of that type, For example, when the primary GPU of a system is shutdown, in order to ensure a high level of system performance, the primary GPU must be brought back to an operational state whenever there is a work request for a GPU. This presents challenges in addition to the challenges posed by shutting down secondary ones of those processing devices.

What is needed, then, are improved methods and systems that allow processing devices to be placed in reduced-power states.

SUMMARY OF EMBODIMENTS

Embodiments described herein generally relate to transitioning a power state of a processing device in response to detecting an idle state of that device. For example, a GPU can be transitioned to a substantially disabled state or a powered state based on whether that GPU is idle or busy. The ability to substantially disable a processing device, such as a GPU, can result in power savings.

In an embodiment, a method of operating a processing device includes, responsive to an idle state of the processing device, transitioning the processing device to a substantially disabled state.

In another embodiment, a device includes a processing device and a power manager module configured to control a power state of the processing device. The power manager module is configured to control the power state of the processing device by a method including: responsive to an idle state, of the processing device, transitioning the processing device to a substantially disabled state.

In another embodiment, a computer readable medium is provided that carries one or more sequences of one or more instructions for execution by one or more processors to perform a method for operating a device, execution of which by the one or more processors, cause the one or more processors to perform operations including, responsive to an idle state of the processing device, transitioning the processing device to a substantially disabled state.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 1A:
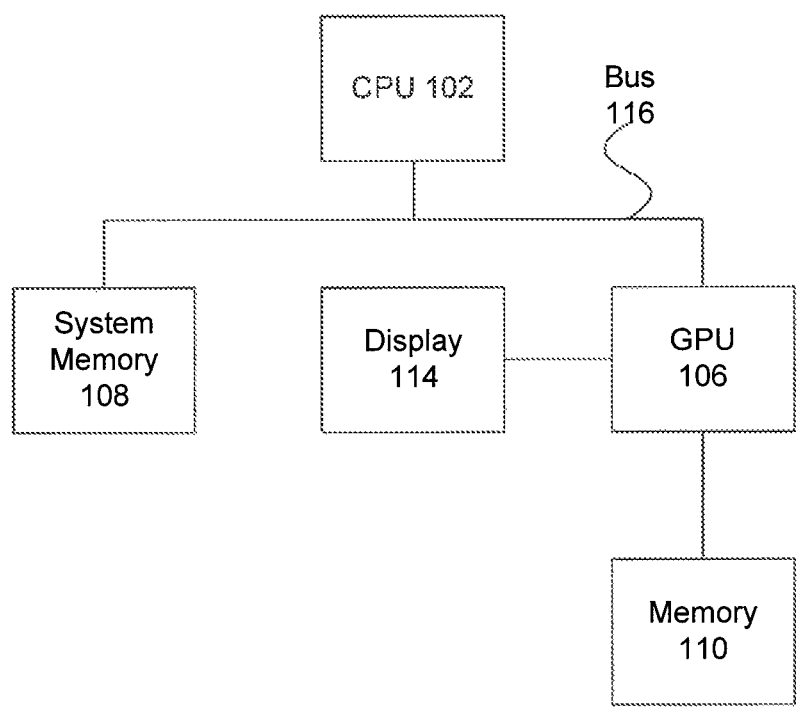
FIG. 1A-1B show block diagrams of exemplary computing environments.

FIG. 1A is a block diagram illustration of a computing environment 100.

Computing environment 100 includes central processing unit 102, a system memory 108, a graphics processing unit (GPU) 106, memory 110 associated with the GPU (sometimes referred to as "graphics memory" or "video memory"), and a display 114.

CPU 102 is coupled to GPU 106 and to system memory 108 through a bus 114. In an embodiment of the present invention, bus 114 is a peripheral component interconnect (PCI) bus, e.g., a PCI express bus. System memory 108 includes a dynamic memory which may hold instructions and/or data that are the input or output of processes or applications executing on the CPU. GPU 106 completes graphics tasks and other tasks suited for single instruction multiple data (SIMD) processing. For example, GPU 106 can complete rendering, display, or other tasks assigned to it by CPU 102. Display 114 can be a variety of different devices that display graphics information such as a computer screen.

GPU 106 is coupled to associated memory 110. Memory 110 store information relevant to the associated GPU. For example, memory 110 can store surfaces rendered by the GPU, graphics to be displayed on display 114, etc.

Figure 1B:
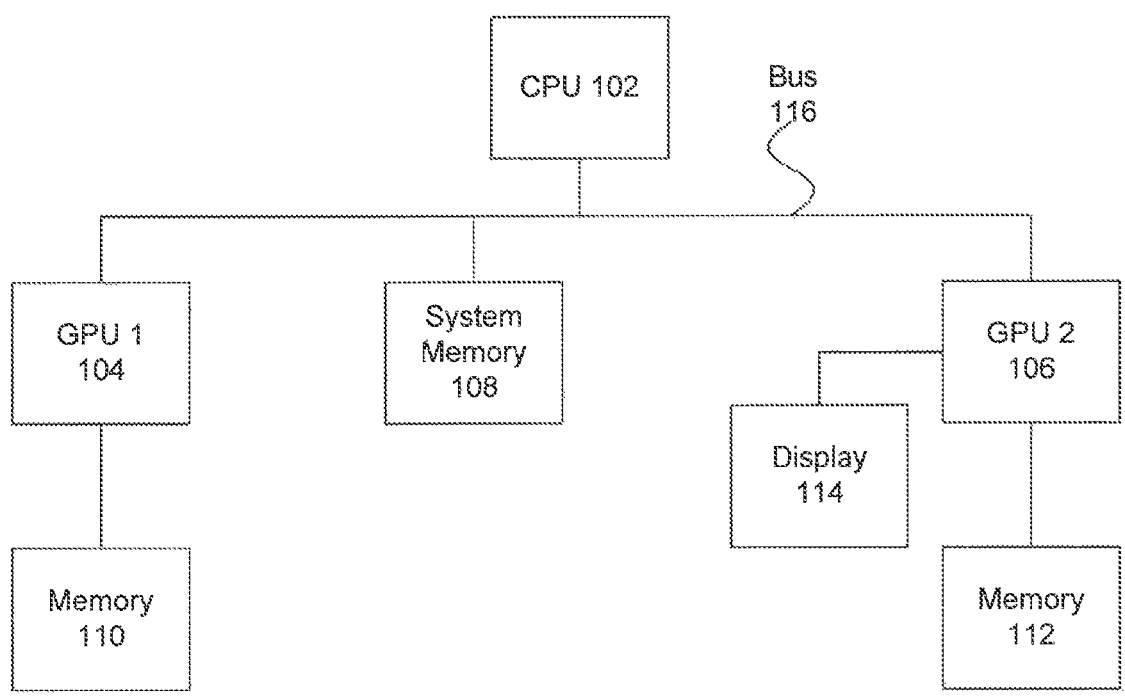

FIG. 1B is a block diagram illustration of another exemplary computing environment 120, according to an embodiment. Computing environment 120 is similar to the computing environment 100 illustrated in FIG. 1A. However, computing environment 120 includes two GPUs, a first GPU 104 and a second GPU 106 with their respective associated memories 110 and 112, whereas computing environment 100 is a single GPU environment. GPUs 104 and 106 can have different roles. For example, second GPU 106 can be a master GPU (also referred to as "primary GPU") because it controls display 114. First GPU 104 can be a slave GPU (also referred to as "secondary GPU") because it does not drive a display. In computing environment 120, display 114 is directly coupled to one of the GPUs. In some embodiments, display 114 may be directly or indirectly coupled to multiple GPUs.

FIGS. 1A-1B illustrate an exemplary single GPU environment and a multiple GPU environments. A person of skill in the art will understand, however, that the teachings in this disclosure are applicable to processing systems with a CPU and one or more other processing devices, such as, GPUs. In a system with one GPU, embodiments of the present invention may control the power state of that only GPU by substantially disabling the GPU when the GPU is not being utilized, and further by activating the GPU to operational state when required again. In systems with multiple GPUs, embodiments of the present invention may control the power state of the primary GPU by substantially disabling that GPU when its services are not needed and by activating it to an operational state when again required. The primary GPU is considered for transitioning to a substantially disabled state when it is detected to be idle and when any existing secondary GPUs have already been substantially disabled or shutdown. Transitioning the secondary GPUs to a substantially disabled state may be performed in accordance with the teachings of U.S. patent application Ser. No. 12/713,935, which is herein incorporated by reference.

An operating system (OS) running on CPU 102 (not shown in FIGS. 1A-1B) generates configuration cycles that are transmitted to processing devices, such as GPUs 104 and 106, over bus 114. If the respective processing devices fail to respond to the corresponding configuration cycle, the OS may execute processes (e.g., plug-and-play) that can cause undesired visual artifacts or a system crash. Thus, even when a GPU is not processing graphics tasks, it can still have to remain powered to respond to configuration cycles. To save power, known methods (e.g., clock gating or power gating) can be used to disable and power down certain portions of the GPU when the GPU is inactive. The known methods, however, can require a substantial amount of the GPU to remain active. Thus, additional power could be saved if the entire GPU, or a substantial portion thereof, is turned off.

In embodiments of the present invention, processing devices (e.g., GPUs) are provided that have an associated bus interface module. The bus interface module is an independently powered module that can be included in the GPU or can be a physically separate device. When the GPU is transitioned to a "substantially disabled state," the bus interface module remains powered and the rest of the GPU is substantially or completely turned off. The GPU is substantially or completely powered off by either selectively turning off power to its execution units and memory or by completely turning off the power to all portions of the GPU except for the bus interface module. The bus interface module is configured to respond to bus configuration cycles when the GPU is in the substantially disabled state so that the operating system running on the CPU is aware that the GPU is still connected, e.g., so that the operating system does not execute the complex processes mentioned above. The bus interface module, in response to bus configuration cycle signals, generates a response just as it would if the GPU were in a powered state. In a further embodiment, the bus interface module also controls the power state of the GPU by controlling the output of voltage regulators that are used to supply power signals to the GPU. In another embodiment, a state management module and/or power manager in the GPU driver, controls the power state of the GPU.

Figure 2:
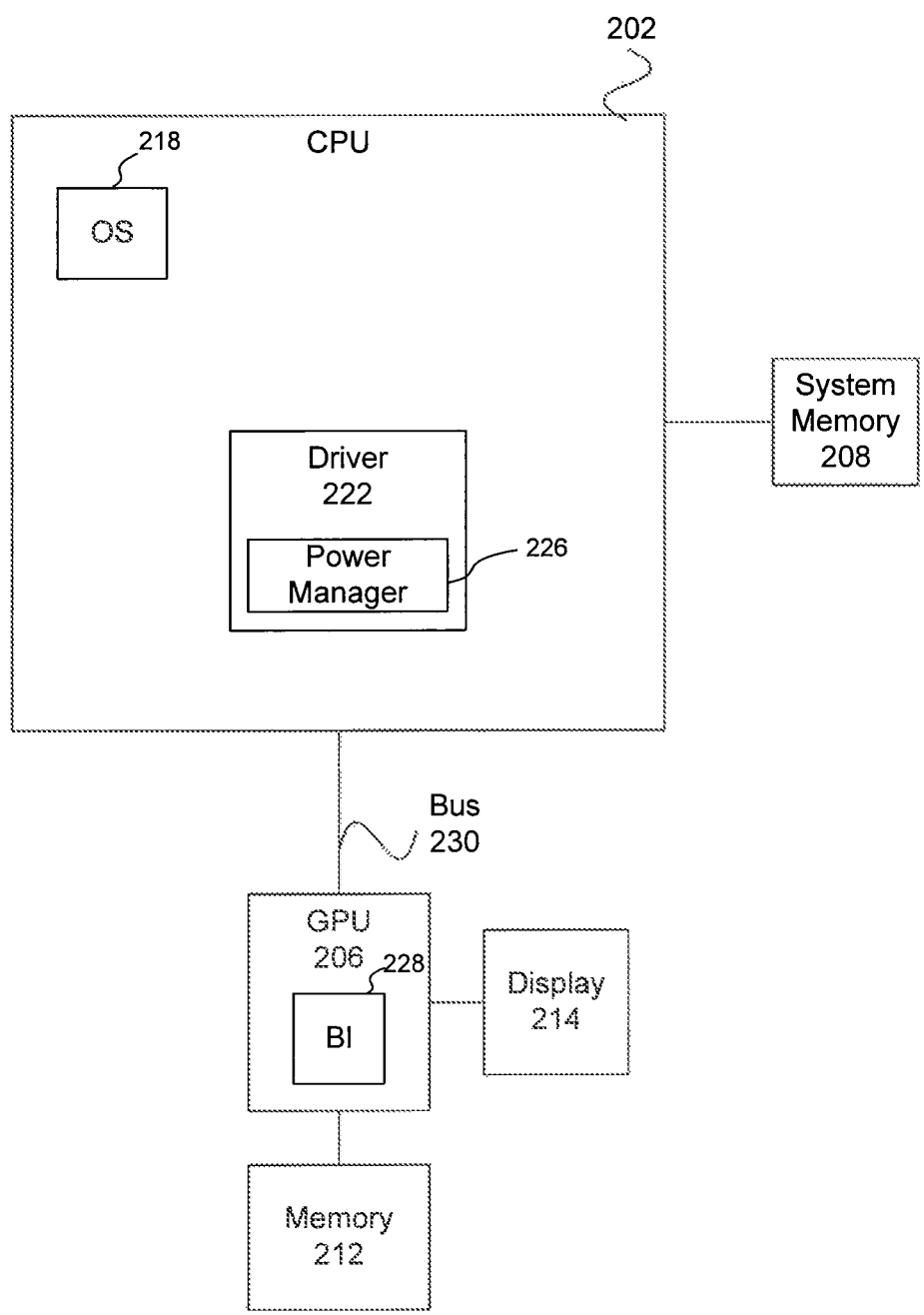
FIG. 2 shows a block diagram of a computing environment, according to an embodiment of the present invention.

FIG. 2 is a block diagram illustration of a computing environment 200 constructed in accordance with an embodiment of the present invention. Computing environment 200 includes a CPU 202, a GPU 206, memories 208 and 212, and a display 214.

OS 218 handles a variety of tasks. For example, OS 218 may detect system events that require, or would be suited for, GPU processing and may generate a request to driver 222. Alternatively, OS 218 may detect when the system transitions to an inactive state, such as, after a defined duration of inactivity, and may generate one or more signals informing driver 222 of the transition. OS 218 may also determine periods during which the system is inactive, and request that the display be turned off.

Driver 222 facilitates interactions with GPU 206. The interactions may, for example, be between OS 218 or other application (not shown) in CPU 202 and GPU 206. As shown in FIG. 2, driver 222 includes a power manager module 226. Power manager module 226 receives the system events and determines power states (e.g., powered or substantially disabled) for the GPU 206. Power manager module 226 may include logic to determine when and how the power state of the GPU is to be changed in accordance with the idle states of the GPU. Power manager module 226 may, in combination with a state management module (not shown in FIG. 2), control various power devices to control the power supplied to the GPU.

CPU 202 is coupled to GPU 206 through bus 230. GPU 206 can be similar to GPU 106 described with reference to FIG. 1B except that GPU 206 additionally includes bus interface module 228. Bus interface module 228 controls the power state of GPU 206 by controlling voltage regulators that provide power to GPU 206. Bus interface module 228 also responds to bus configuration cycles. For example, bus interface module 228 can be configured to remain powered when GPU 206 is switched to a substantially disabled state so that it can respond to bus configuration cycles. In doing so, GPU 206 can be switched to a substantially disabled state and still respond to bus configuration cycles as if it is in a powered state.

As shown in FIG. 2, GPU 206 is coupled to display 214. GPU 206 is coupled to associated memory 212 which is substantially similar to memory 112 described above.

Figure 3:
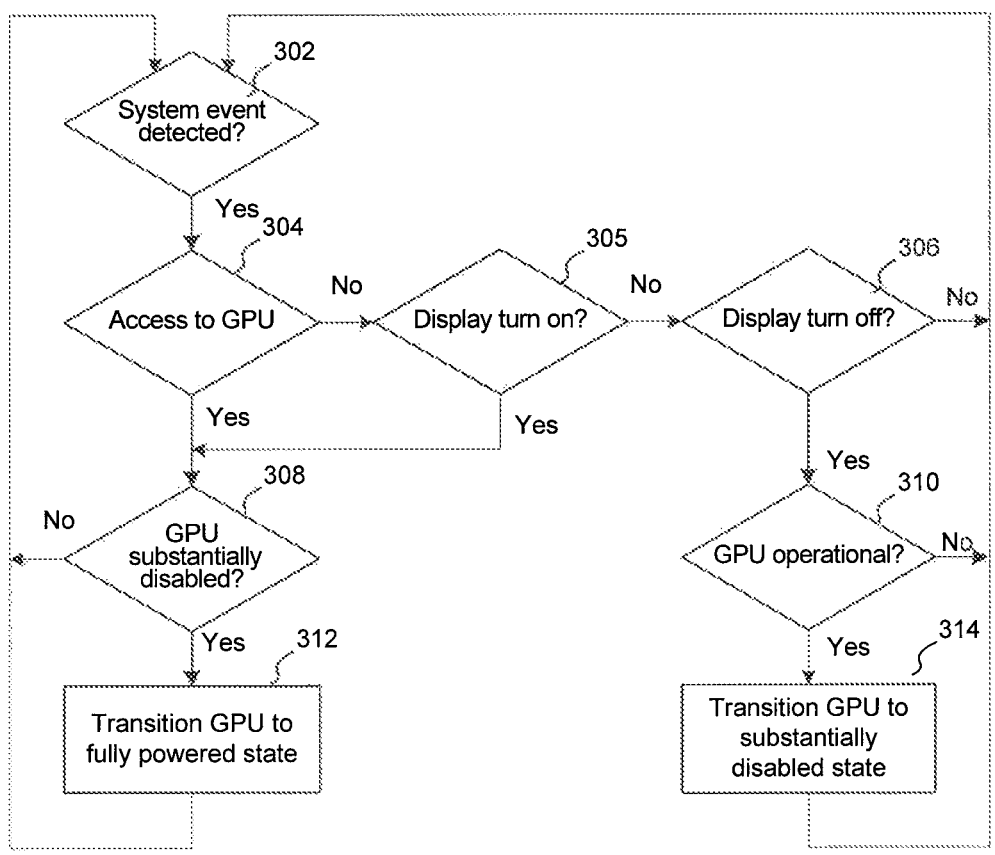
FIG. 3 is a flowchart illustrating an embodiment of the operation of a GPU driver, according to an embodiment of the present invention.

FIG. 3 is an exemplary flowchart 300 illustrating an embodiment of the operation of power manager 226 in accordance with the present invention. Other structural and operational embodiments will be apparent to persons skilled in the relevant art(s) based on the following discussion. Flowchart 300 is described with reference to the embodiment of FIG. 2. However, flowchart 300 is not limited to that embodiment. The steps shown in FIG. 3 do not necessarily have to occur in the order shown, and are described in detail below.

In step 302, it is determined whether a system event has been detected. For example, the system event can be graphics job submission or other access to the GPU, or the request to turn the display on or off. The signal to shutoff the display can be generated, for example, by the OS upon expiry of a defined duration without system activity.

Once a system event has been detected, flowchart 300 proceeds to step 304. In step 304, it is determined whether the system event was the access to the GPU. In step 308, a determination is made as to whether the GPU is already in the substantially disabled state. If the GPU is not in the substantially disabled state, flowchart 300 returns to step 302. If the GPU is in the substantially disabled state, step 312 is reached.

In step 312, a command is generated to transition a GPU, currently in a substantially disabled state, to a powered state. For example, the GPU can be in a substantially disabled state when the access request is detected because no application was running that required graphics processing capabilities of the GPU. When the request to access the GPU is detected, the GPU can be transitioned to the powered state to provide graphics processing capabilities.

If the system event at step 304 is not an access to the GPU, method 300 proceeds to step 305. In step 305, it is determined whether the system event is a signal to turn on the display. If yes, then method 300 proceeds to step 308.

If the system event is not the access to GPU and not the signal to turn the display on, step 306 occurs after step 305. In step 306, it is determined whether the system event was a signal to turnoff the display. If the system event is not a signal to turn the display off, flowchart 300 returns to step 302. If the system event is a signal to turn the display off, step 310 is reached.

Step 310 determines whether the GPU is in an operational state. If so, flowchart 300 advances to step 314. In step 314, the GPU is transitioned to a substantially disabled state. The transitioning of the GPU to a substantially disabled state may include evicting at least a portion of the GPU memory to the system memory and/or may include declaring at least portions of GPU memory as tiled so that the CPU would not directly access that memory.

Flowchart 300 illustrates an embodiment of the operation of power manager 226 with regard to system events relating to access requests to the GPU and signals to turn displays on or off. As would be appreciated by those skilled in the relevant arts based on the description herein, power manager 226 can respond to other types of system events, such as, but not limited to, changes in the power supply.

Figure 4:
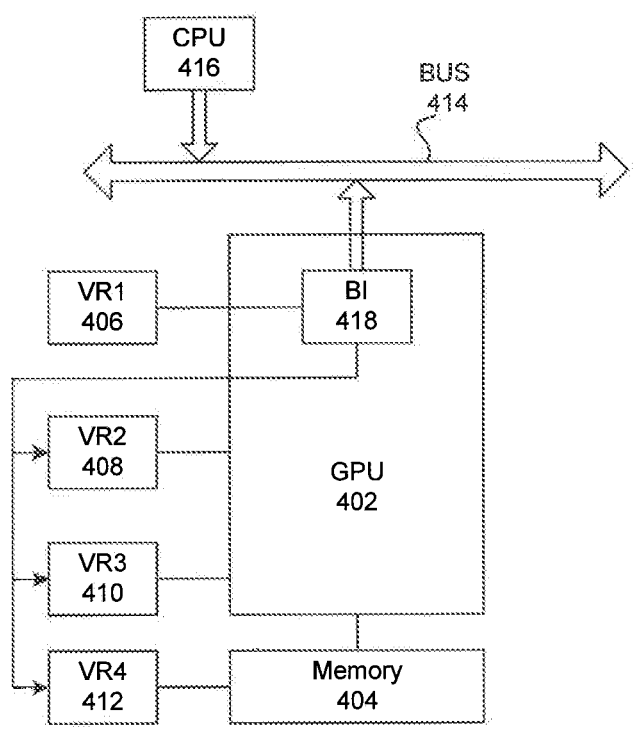
FIGS. 4-10 show block diagrams of computing environments, according to embodiments of the present invention.

FIG. 4 is a block diagram illustration of a computing environment 400, according to an embodiment of the present invention. Computing environment 400 includes a GPU 402, a memory 404, voltage regulators 406-412, a bus 414, and a CPU 416.

GPU 402 can be substantially similar to GPU 206 described above. GPU 402 is powered by signals output by voltage regulators 406-410. GPU 402 is coupled to an associated memory 404. Memory 404 can be substantially similar to memory 212, described above, and is powered by a signal output by voltage regulator 412.

Voltage regulators 406-410 power specific circuit blocks that form GPU 402. Voltage regulator 406 is a dedicated voltage regulator that provides power to bus interface module 418. Voltage regulators 408 and 410 provide power to other circuit blocks of GPU 402. For example, voltage regulator 408 and voltage regulator 410 can provide power to a rendering circuit block and a display controller circuit block, respectively, of GPU 402. Bus interface module 418 receives commands from CPU 416 over bus 414 regarding the power state of GPU 402 and controls the outputs of voltage regulators 408-412 based on the command. The command and/or signals received by bus interface module 418 may be from a driver, such as, driver 222, executing in CPU 416.

Figure 5:
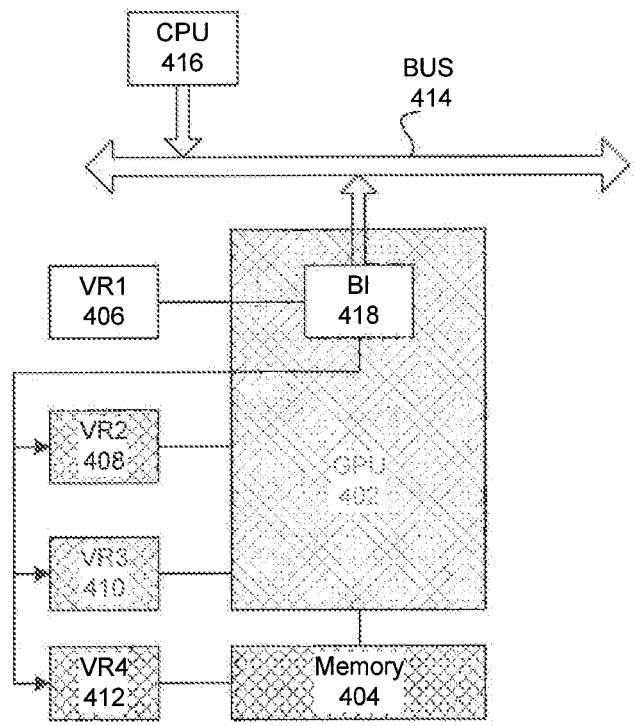

By way of example, FIG. 5 is a block diagram illustration 500 of an alternative computing environment 400 after bus interface module 418 receives a command from CPU 416 to transition GPU 402 to a substantially disabled state. The command and/or signals received by bus interface module 418 may be from a driver, such as, driver 222, executing in CPU 416. As noted above in relation to FIG. 4, a driver, such as, driver 222, executing in CPU 416 may send the command or signal to bus interface module 418. Bus interface module 418 disables the outputs of voltage regulators 408-412 so that substantially all of GPU 402 and associated memory 404 are powered down. As shown in FIG. 5, however, dedicated voltage regulator 406 continues to provide power to bus interface module 418 even when GPU 402 is in the substantially disabled state. In a further embodiment, bus interface module 418 is configured to respond to configuration cycles generated by CPU 416 so that an operating system running on CPU 416 does not execute the complex processes described above. Thus, even while in a substantially disabled state, GPU 402 still generates responses to bus configuration cycles as if it were in a powered state.

Bus interface module 418 uses relatively little power compared to the rest of GPU 402. Keeping bus interface module 416 powered even when GPU 402 is in a substantially disabled state, then, does not significantly detract from the total possible power savings.

Figure 6:
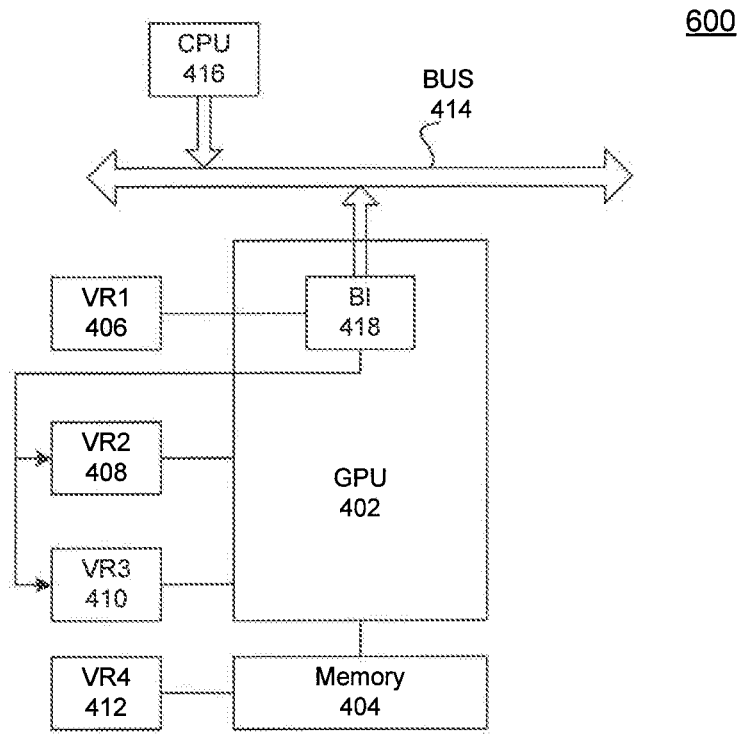

FIG. 6 is a block diagram illustration of a computing environment 600, according to an embodiment of the present invention. Computing environment 600 is substantially similar to computing environment 400 shown in FIGS. 4 and 5. In the illustration of FIG. 6, however, bus interface module 418 only controls the outputs of voltage regulators 408 and 410 rather than voltage regulators 408-412 as in computing environment 400.

Figure 7:
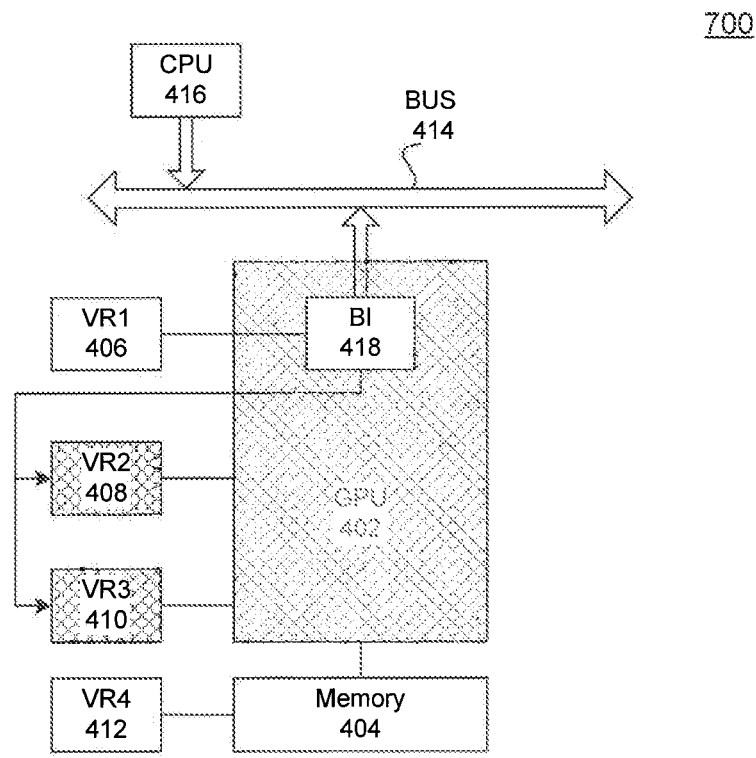

FIG. 7 is a block diagram illustration of computing environment 600 after bus interface module 418 receives command to transition GPU 402 to a low power state. In FIG. 7, only GPU 402 is transitioned to a substantially disabled state by disabling the outputs of voltage regulators 408 and 410. Since bus interface module 418 is not coupled to voltage regulator 412, memory 404 remains powered when GPU 402 is in a substantially disabled state. In such a manner, memory contents are retained while GPU 402 is in a substantially disabled state. In a further embodiment, more power can be saved by switching the memory module to the self-refresh mode.

Figure 8:
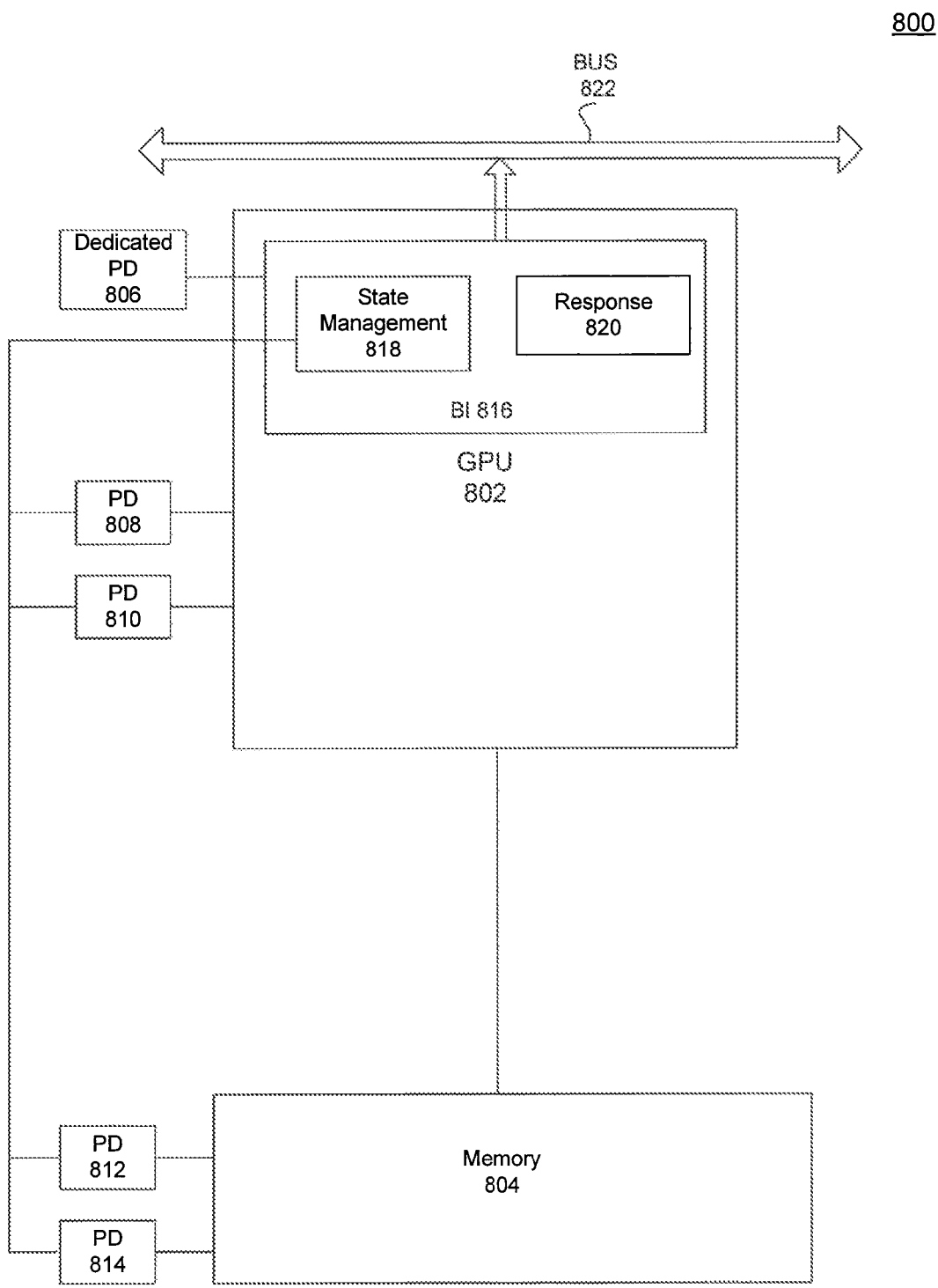

FIG. 8 is a block diagram illustration of a computing environment 800, according to an embodiment of the present invention. Computing environment 800 includes a GPU 802, a memory 804, a dedicated power device 806, power devices 808-814, a state management module 818, and a bus 822. GPU 802 includes a bus interface module 816. Bus interface module 816 includes a response module 820.

Power devices 806-814 can be any type of device that provides a signal to power portions of GPU 802 and/or memory 804. For example, power devices 806-814 can include voltage regulators and/or current sources. As shown in FIG. 8, power devices 808 and 810 provide power to GPU 802. In other embodiments, any number of power devices can be used to provide power to aspects of GPU 802. For example, a power device may be provided for each type of circuit block that makes up GPU 802. Power devices 812 and 814 provide power to memory 804. In alternate embodiments, any number of power devices can be used to power memory 804.

For example, different power devices can be used to provide power to different portions of memory 804. Increasing the number of voltage regulators coupled to GPU 802 or memory 804 increases the number of circuit blocks within each element that can be independently powered. Dedicated power device 806 provides power to bus interface module 816. In an embodiment, dedicated power device 806 continues to provide power to bus interface module 816 even when GPU 802 and/or memory 804 are transitioned to substantially disabled states.

State management module 818 receives commands or signals from a power manager in the GPU driver, for example, such as power manager 226 illustrated in FIG. 2 and controls the outputs of power devices 808-814 to control the power states of GPU 802 and/or memory 804. In particular, based on the command received from power manager in the driver, state management module 818 determines which of the power devices are to output a power signal and which of the power devices will have their outputs disabled, and thus disabling the circuit blocks to which those power devices are coupled. Moreover, based on one or more signals received from the CPU or GPU driver, where the received one or more signals are indicative of conditions for an idle state of GPU 802 (e.g., such as, a signal to shutdown the display) and a detection of an idle state in the GPU, power manager 226 and/or state management module 818 can transition GPU 802 from a powered state to a substantially disabled state, or vice versa.

Response module 820 receives bus configuration cycles generated by the CPU and generates appropriate responses. The responses are transmitted to the CPU so that the OS running on the CPU does not realize that GPU 802, and/or memory 804, has been transitioned to a substantially disabled state. For example, bus 822 can be a PCI Express bus and the bus configuration cycles can be PCI configuration cycles. In such an embodiment, response module 820 is configured to respond to PCI configuration cycles when GPU 802 is in a substantially disabled state or partially powered state similar to as it would if GPU 802 was in a powered state. Thus, the CPU will not execute the complex processes leading to negative effects described above.

Figure 9:
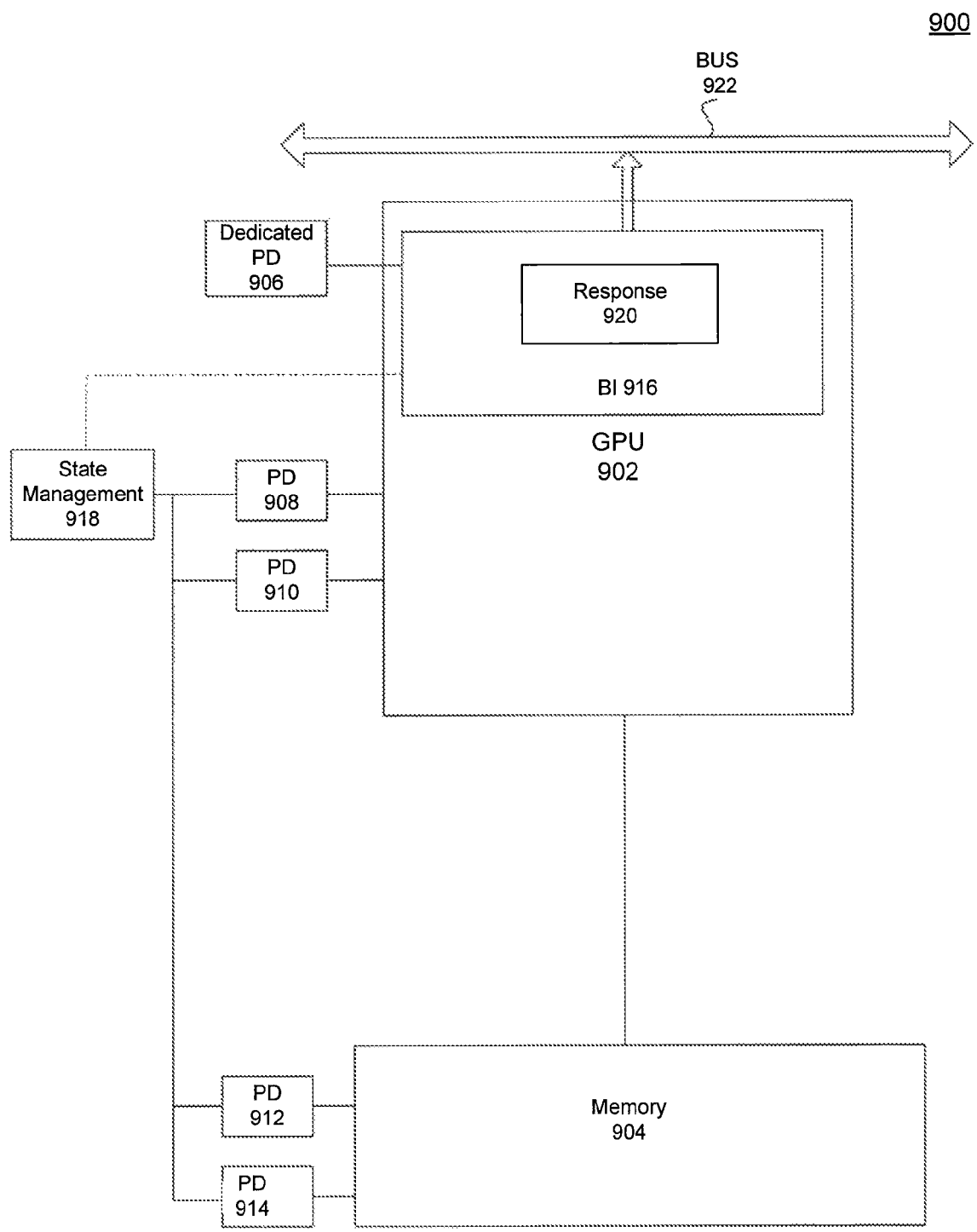

FIG. 9 is a block diagram illustration of a computing environment 900, according to an embodiment of the present invention. Computing environment 900 includes a GPU 902, a memory 904, a dedicated power device 906, power devices 908-914, and bus 822. GPU 902 includes a bus interface (BI) module 916. Bus interface module 916 includes a response module 920. Computing environment 900 is substantially similar to computing environment 800 except that BI module 916 does not control the power states of GPU 902 and memory 904. Rather, another device, i.e., state management module 918, is used to control the power states of GPU 902 and memory 904.

In an embodiment, GPU 902 responds to bus configuration cycles when it is a powered state. However, when GPU 902 transitions to a substantially disabled state, BI module 906, instead of GPU 902, responds to the bus configuration cycles. As shown in FIG. 9, BI module 906 can be coupled to state management module 918 so that BI module 906 is made aware of the power state of GPU 902.

Figure 10:
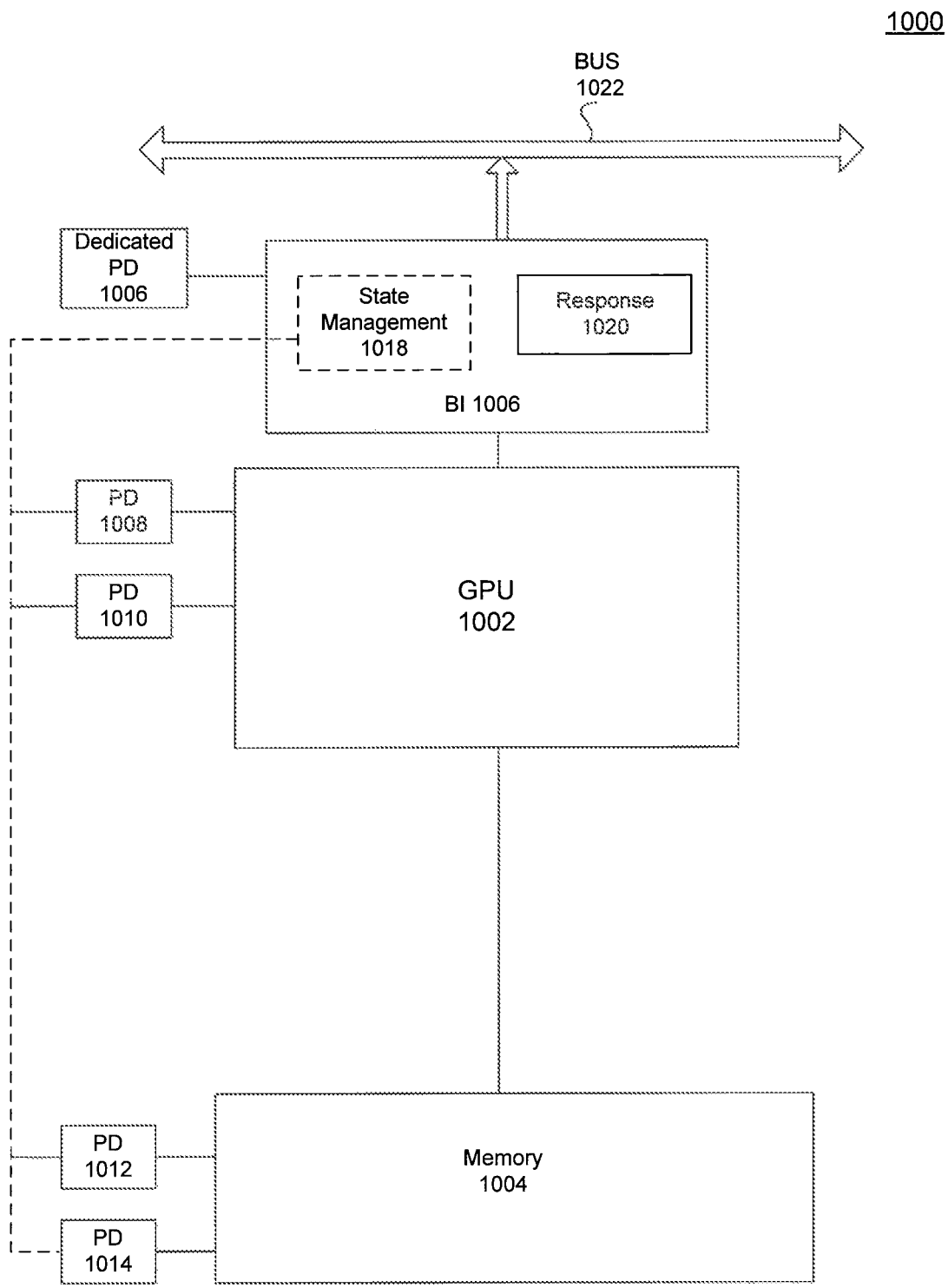

FIG. 10 is a block diagram illustration of a computing environment 1006, according to an embodiment of the present invention. Computing environment 1000 includes a GPU 1002, a memory 1004, a dedicated power device 1006, power devices 1008-1014, and bus 822. GPU 1002 includes a bus interface (BI) module 1016. Bus interface module 1016 includes a state management module 1018 and a response module 1020. State management module 1018 may be implemented in BI module 1016 (as in computing environment 800) or as a separate device (as in computing environment 900). Computing environment 1000 is substantially similar to computing environment 800 except that BI module 1016 is implemented as a device separate from GPU 1002. For example, BI module 1016 can be a different device formed on the same printed circuit board or substrate as GPU 1002 and coupled to GPU 1002 using traces. Alternatively, BI module 1006 can be a separate device coupled to GPU 1002 using another device (e.g., a motherboard).

Figure 11:
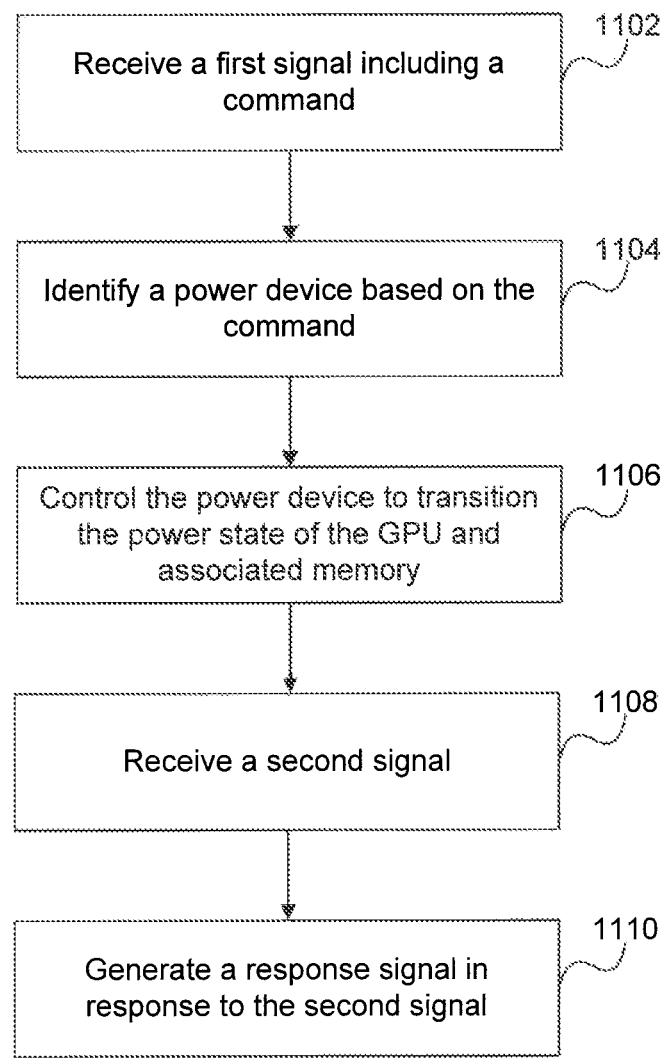
FIG. 11 is a flowchart illustrating a method of operating a device exemplified in this embodiment as a GPU, according to an embodiment of the present invention.

FIG. 11 is a flowchart of an exemplary method 1100 of operating a GPU, according to an embodiment of the present invention. Other structural and operational embodiments will be apparent to persons skilled in the relevant art(s) based on the following discussion. Flowchart 1100 is described with reference to the embodiment of FIG. 8. However, flowchart 1100 is not limited to that embodiment. The steps shown in FIG. 11 do not necessarily have to occur in the order shown. The steps of FIG. 11 are described in detail below.

In step 1102, a first signal including a command to transition the power state of the GPU is received. For example, in FIG. 8 GPU 802 can receive a signal including a command to transition GPU 802 to a substantially disabled state or a partially powered state from a CPU over bus 822.

In step 1104, a power device is identified based on the command. In FIG. 8, state management module 818 can identify one or more of power devices 808-814 based on the command. For example, state management module 818, based on the command, can determine which portions of GPU 802 and/or memory 804 are to be disabled. Based on this determination, state management module 818 can identify power devices that supply power to those portions of GPU 802 and/or memory 804 as being power devices that should have their outputs disabled. For example, power device 808 can be coupled to a rendering engine of GPU 802 and power device 810 can be coupled to a display controller of GPU 802. Having determined that the rendering engine and/or display controller of GPU 802 should be disabled, state management module 818 identifies the corresponding power device.

In step 1106, the identified power device is controlled to transition the GPU to a substantially disabled state or a partially powered state. For example, in FIG. 8, state management module 818 controls the output of the power devices identified in step 1006 to transition GPU 802 and associated memory 804 to power states specified in the received command.

In step 1108, a second signal is received. For example, in FIG. 8, GPU 802 can receive a bus configuration cycle transmitted by a CPU over bus 822. The bus configuration cycle can be a PCI configuration cycle.

In step 1110, a response signal is generated in response to the second received signal. For example, in FIG. 8, response module 820 of bus interface module 816 can generate an appropriate response to the received bus configuration cycle. Because dedicated voltage regulator 806 continues to provide power to bus interface module 816, even when GPU 802 is in a substantially disabled state, response module 820 is able to generate appropriate responses to bus configuration cycles even when GPU 802 is in a substantially disabled state or partially powered state. Thus, an OS running on the CPU does not realize that first GPU 802 has been transitioned to a substantially disabled state. In such a manner, undesired visual artifacts or the system crashes associated with the OS determining that GPU 806 has been switched to a substantially disabled state can be avoided.

Figure 12:
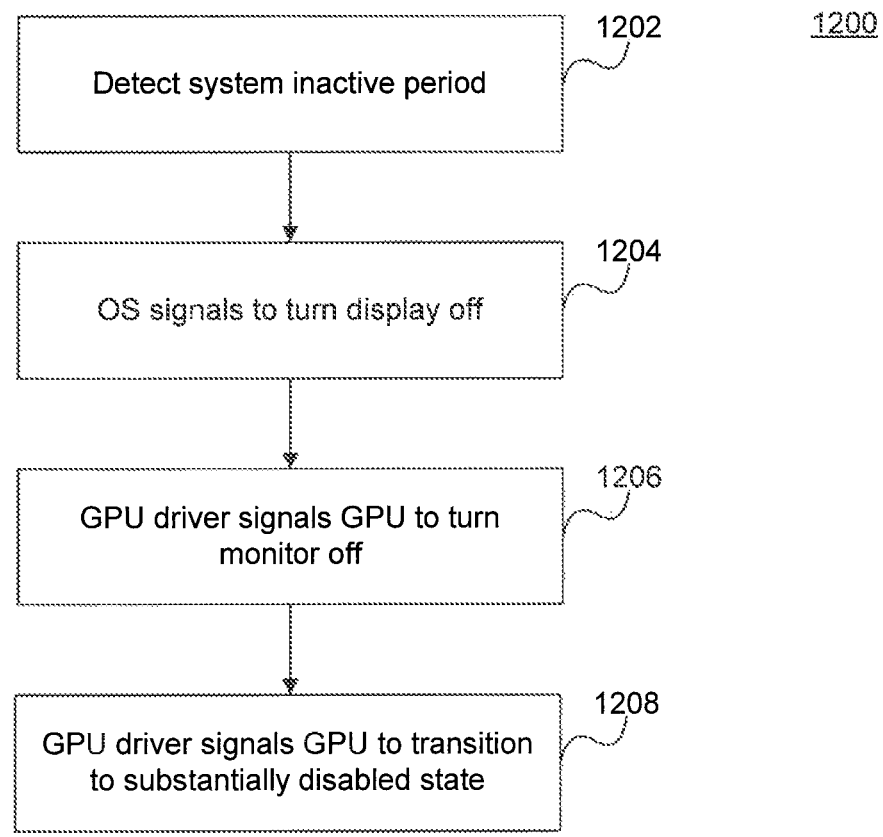
FIG. 12 is a flowchart illustrating a method for triggering a processing device, exemplified in this embodiment as a GPU, to transition to a substantially disabled state, according to an embodiment of the present invention.

FIG. 12 is a flowchart of an exemplary method 1200 of triggering a GPU to transition to a substantially disabled state, according to an embodiment of the present invention. Other structural and operational embodiments will be apparent to persons skilled in the relevant art(s) based on the following discussion. Method 1200 is described with reference to the embodiments of FIG. 2 and FIG. 8. However, method 1200 is not limited to those embodiments. The steps shown in FIG. 12 do not necessarily have to occur in the order shown, or include all of the steps shown. The steps of FIG. 12 are described in detail below.

In step 1202, a system inactivity state is detected. The detection may be made by the OS. A system inactivity state may be detected, for example, based upon the elapsing of some time period without user input and without any application using the display.

In step 1204, responsive to the detection of the system inactivity state, the OS requests that the display is turned off. According to an embodiment, when the display is directly connected to the GPU (the GPU being considered for transitioning to the substantially disabled state) the OS request is sent to the driver associated with the primary GPU (e.g., driver 222 associated with GPU 206 in FIG. 2). In another embodiment, when the display is not connected to the subject GPU, the driver associated with the subject GPU may be notified of the display being turned off by an OS event.

In step 1206, if the subject GPU is directly connected to the display, the GPU driver turns off the display. The GPU driver may issue the one or more commands to turn off the display.

In step 1208, the GPU driver initiates the transition of the GPU to a substantially disabled state. According to an embodiment, the driver commands the GPU to transition to the substantially disabled state. The driver can specify whether or not the entire GPU should be powered off, whether selected processing blocks are not to be powered off; and whether or not the memory associated with the GPU is to be powered off. As described above, when the GPU is in a substantially disabled state, the bus configuration module associated with the GPU continues to be powered on to allow responses to bus configuration cycles.

Figure 13:
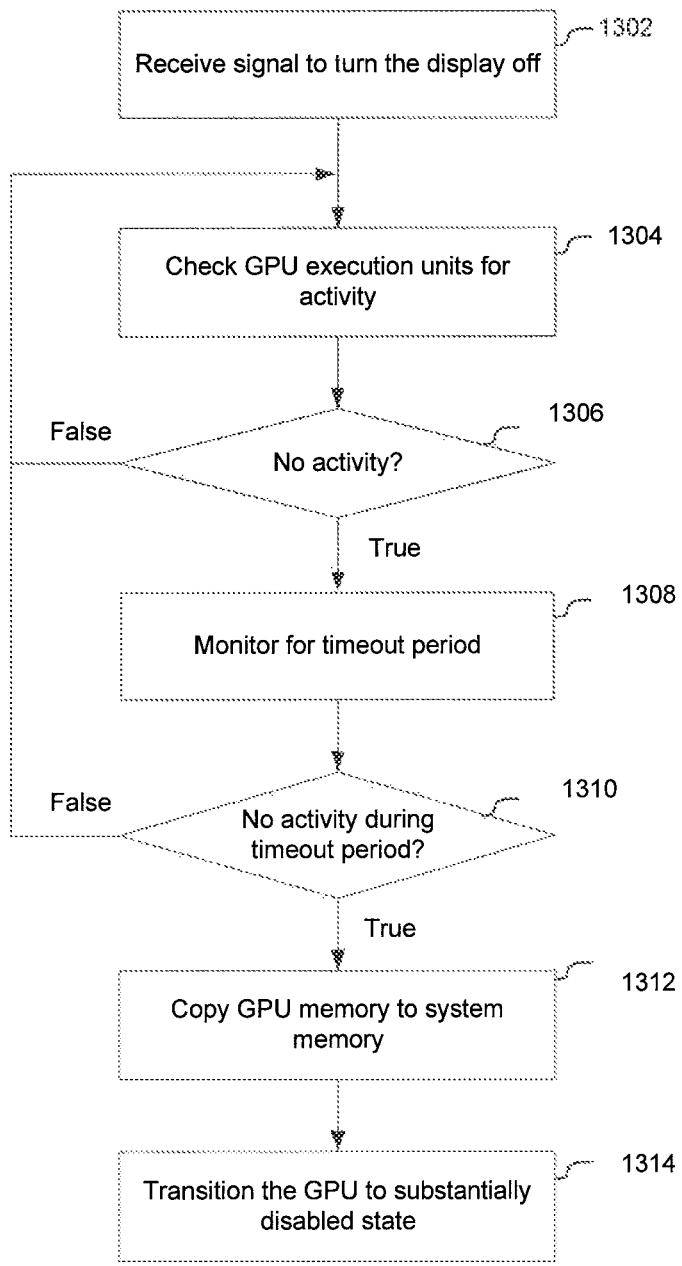
FIG. 13 is a flowchart illustrating a method for a processing device, exemplified in this embodiment as a GPU, to transition into a substantially disabled state, according to an embodiment of the present invention.

FIG. 13 is a flowchart of an exemplary method 1300 of performing a transition of a GPU to a substantially disabled state, according to an embodiment of the present invention. Other structural and operational embodiments will be apparent to persons skilled in the relevant art(s) based on the following discussion. Method 1300 is described with reference to the embodiments of FIG. 2 and FIG. 8. However, method 1300 is not limited to those embodiments. The steps shown in FIG. 13 do not necessarily have to occur in the order shown. The steps of FIG. 13 are described in detail below.

In step 1302, the GPU driver receives a signal to turn the display off. According to some embodiments, one or more other signals that may indicate an idle GPU may be received in addition to, or in place of, the signal to turn the display off.

In step 1304, the GPU is monitored to determine whether any activity is present. In accordance with an embodiment, the various execution units of the GPU, for example, the rendering block(s), compute block(s), audio and video blocks, direct memory access blocks, and the like, are monitored for any ongoing processing activity. This monitoring may be performed by, for example, state management module 818 and/or power manager 226, or other module associated with the driver. Monitoring may include keeping track, by the driver and/or another module, of the requests that are currently pending in the GPU (e.g., work request queue). Monitoring may also include polling of the various processing blocks of the GPU to determine their busy status. The polling may include checking one or more registers that indicate the hardware status of the respective execution units. In addition to the current busy status of the execution units, the queues of work may be monitored to determine the idle state.

In step 1306, based upon the monitoring performed in step 1302, it is determined whether the GPU was idle. If activity is detected, method 1300 may proceed back to step 1304 to continue monitoring.

When no activity is detected, then method 1300 proceeds to step 1308, where the GPU is monitored over a predetermined timeout period for any processing activity. In another embodiment, steps 1308-1310 may be skipped and method 1300 may proceed directly to either step 1312 or to step 1316. At the end of the timeout period of step 1308, method 1300 proceeds to step 1310.

In step 1310, if it is determined that there was processing activity that occurred during the timeout interval, then method 1300 proceeds back to step 1304 to continue monitoring for inactivity. If, at step 1310, it is determined that no activity occurred during the timeout period, then method 1300 proceeds to step 1312.

In step 1312, according to an embodiment, the GPU memory or selected portions of the GPU memory are copied to system memory. According to an embodiment, the driver associated with the GPU (e.g., driver 222 associated with GPU 206 shown in FIG. 2) triggers the OS to control the copying of the memory from the video memory to the system memory. For example, the OS may be signaled to evict the video memory to system memory. Upon receiving a signal from driver 222 to evict video memory 212, OS 218 may copy all or selected portions of video memory 212 to system memory 208. By copying video memory 212 to system memory 208, OS 218 can now redirect requests for memory 212 to the corresponding areas in system memory 208 instead of the video memory 212.

In another embodiment, the video memory may be copied to system memory without being controlled by the OS. In such environments, the driver may indicate to the OS that the particular memory content that is copied as now being in system memory instead of in video memory.

In step 1314, the GPU driver saves hardware context and signals the GPU to transition to a substantially disabled state. According to an embodiment, a state management module (e.g., module 818 illustrated in FIG. 8) can select which power units coupled to the GPU are shutdown. After saving hardware context, the selected power units can be turned off.

According to one embodiment, a complete shutdown of the GPU is performed. A complete shutdown of the GPU would result in all the power units coupled to the GPU being shutdown except for the power unit to the bus interface unit. The bus interface unit is kept powered-on so that responses may be provided to the bus configuration cycles, According to another embodiment, selected execution units of the GPU may be kept powered on, while powering off other execution units. In yet another embodiment, the substantially disabled state includes powering off the GPU except for the bus interface unit and the memory associated with the GPU. Keeping the memory associated with the GPU powered on enables the transition to the substantially disabled state without first having to copy the video memory to system memory. It also avoids a delay, although a small delay, associated with copying a portion of the memory (e.g., the frame buffer) back to video memory from system memory upon bringing the GPU back to an operational state. In the embodiments in which the video memory stays powered on during the substantially disabled state of the GPU, the video memory may be in a self-refresh mode. In order to prevent the OS from accessing the video memory directly, the driver may declare this memory as being tiled so that the OS is forced to request the driver assistance for any access to that memory. The OS does not have the ability to read tiled memory by itself. According to an embodiment, when the driver receives a request from the OS for assistance in accessing tiled memory, the driver may power on the GPU.

Figure 14:
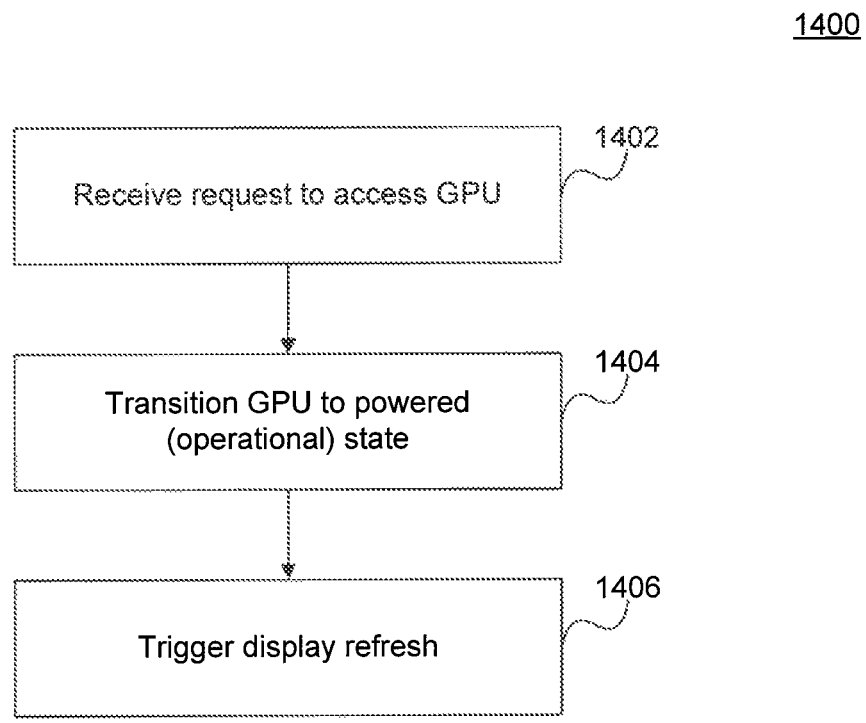
FIG. 14 is a flowchart illustrating a method for a processing device, exemplified in this embodiment as a GPU, into an operational state from a substantially disabled state, according to an embodiment of the present invention.

FIG. 14 is a flowchart of an exemplary method 1400 of operating a GPU to transition to a powered state, according to an embodiment of the present invention. Other structural and operational embodiments will be apparent to persons skilled in the relevant art(s) based on the following discussion. Method 1400 is described with reference to the embodiments of FIG. 2 and FIG. 8. However, method 1400 is not limited to those embodiments. The steps shown in FIG. 14 do not necessarily have to occur in the order shown. The steps of FIG. 14 are described in detail below According to an embodiment, method 1400 may be performed in transitioning GPU 802 from a substantially disabled state back to an operational state.

In step 1402, the GPU driver, such as, for example, driver 222 for GPU 206 illustrated in FIG. 2, receives a request to access the GPU. The request may include a request to access the memory associated with the GPU, to submit a job to the CPU, or to turn the display on.

Responsive to receiving the GPU access request, the GPU driver determines the current state of the GPU. If the GPU is currently in a substantially disabled state, the driver initiates the transition of the GPU to a powered state. Transitioning the GPU to a powered state includes powering on the power devices that supply power to the various components of the GPU. For example, in some embodiments, the bus interface module of the GPU, the memory associated with the GPU, and other components of the GPU may be separately powered. In yet other embodiments, some of the execution units within the GPU may have their own separate power.

In step 1406, when the GPU has been powered on, the GPU driver may trigger a refresh of the main surface currently displayed in the display. The refresh may be triggered by the driver issuing a command to the GPU to copy the previously saved content from system memory back to the GPU memory, and then to refresh the display using the content in the GPU memory. In another embodiment, the refresh may be triggered by the driver causing the OS to request the display refresh. The refresh requires only that the frame buffer contents, which is generally a relatively small amount of data compared to the entire video memory, are copied from the system memory back to the video memory. In some embodiments where the GPU was in a substantially disabled state while its associated memory remained powered on and in self refresh mode, this initial copying of the frame buffer from the system memory to the video memory may be avoided.

It is to be appreciated that the Detailed Description section, and not the Abstract section, is intended to be used to interpret the claims. The Abstract section may set forth one or more, but not all, exemplary embodiments of the present invention as contemplated by the inventor(s), and thus, are not intended to limit the present invention and the appended claims in any way. The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed. The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. The breadth and scope of the present invention should not be limited by any of the above-described exemplary embodiments, but should be defined only in accordance with the following claims and their equivalents.

What is claimed is:

1. A method comprising:
   detecting an idle state of a primary processing device;
   detecting a substantially disabled state for one or more secondary processing devices; and
   transitioning the primary processing device to a substantially disabled state in response to the detecting of the idle state and to the detecting of the substantially disabled state for the one or more of the secondary processing devices,
   wherein the primary processing device generates a first response signal in response to a first received bus configuration cycle signal when the primary processing device is in the substantially disabled state,
   wherein the first response signal is substantially similar to a second response signal generated by the primary processing device in response to a second received bus configuration cycle when the primary processing device is in an operational state.

2. The method of claim 1, wherein the detecting comprises detecting a status of a display associated with the primary processing device.

3. The method of claim 1, further comprising:
   transitioning the primary processing device in the substantially disabled state to the operational state in response to receiving a signal to access the primary processing device.

4. The method of claim 1, wherein the detecting comprises one or more of:
   detecting that one or more execution units are not in use;
   detecting that one or more execution units are not in use for a duration of a time threshold; and
   receiving a signal indicating turning off of a display associated with the primary processing device.

5. The method of claim 1, wherein the transitioning comprises:
   saving content from a memory associated with the primary processing device to a system memory.

6. The method of claim 5, wherein the transitioning further comprises:
   notifying an operating system of the saving.

7. The method of claim 1, wherein transitioning comprises:
   disabling an output voltage of a power device coupled to the primary processing device.

8. The method of claim 7, wherein:
   the primary processing device is a graphics device, and
   the power device is coupled to at least one of a rendering engine or a display controller of the graphics device.

9. The method of claim 8 wherein the primary processing device comprises a plurality of graphics devices.

10. The method of claim 1, further comprising:
    disabling at least a portion of a memory associated with the primary processing device when the primary processing device is in the substantially disabled state.

11. The method of claim 10, wherein the disabling comprises:
    disabling an output voltage of a power device coupled to the memory.

12. The method of claim 1, wherein the primary processing device is coupled to a plurality of power devices, the method further comprising:
    identifying, based on the detecting, a power device of the plurality of power devices, wherein transitioning the primary processing device to the substantially disabled state includes disabling an output of the identified power device.

13. A system, comprising:
    a primary processing device;
    a power manager configured to:
    detect an idle state of the processing device;
    detect a substantially disabled state for one or more secondary processing devices; and
    transition the primary processing device to a substantially disabled state in response to the detection of the idle state and to the detecting of the substantially disable state for the one or more of the secondary processing devices; and
    a bus interface, comprising a response module configured to generate a first response signal in response to a first received bus configured cycle signal when the primary processing device is in the substantially disabled state, the first response signal being substantially similar to a second response signal generated by the primary processing device in response to a second received bus configuration cycle when the primary processing device is in an operational state.

14. The system of claim 13, further comprising:
    a bus interface,
    a response module configured to generate a response signal in response to a received signal when the primary processing device is in a substantially disabled state,
    wherein the bus interface is coupled to a power device configured to supply power to the bus interface when the primary processing device is in the substantially disabled state.

15. The system of claim 13, wherein:
    the primary processing device is coupled to a power device, and
    the power manager is configured to control an output of the power device to control the power state of the primary processing device.

16. The system of claim 15, wherein:
    the power device is coupled to a memory associated with the primary processing device, and
    the power manager is configured to control the power state of the memory by controlling an output of the power device.

17. A non-transitory computer readable medium having one or more instructions recorded thereon, execution of which by a processor cause the processor to perform operations comprising:
    detecting an idle state of a primary processing device;
    detecting a substantially disabled state for one or more secondary processing devices; and
    transitioning the primary processing device to a substantially disabled state in response to the detecting of the idle state and to the detecting of the substantially disabled state for the one or more of the secondary processing devices,
    wherein the primary processing device generates a first response signal in response to a first received bus configuration cycle signal when the primary processing device is in the substantially disabled state,
    wherein the first response signal is substantially similar to a second response signal generated by the primary processing device in response to a second received bus configuration cycle when the primary processing device is in an operational state.

18. The non-transitory computer readable medium of claim 17, wherein the detecting is based at least upon a status of a display associated with the primary processing device.

* * * * *

UNITED STATES PATENT AND TRADEMARK OFFICE
CERTIFICATE OF CORRECTION

PATENT NO. : 8,943,347 B2  Page 1 of 1
APPLICATION NO. : 13/439569
DATED : January 27, 2015
INVENTOR(S) : Khodorkovsky et al.

It is certified that error appears in the above-identified patent and that said Letters Patent is hereby corrected as shown below:

IN THE CLAIMS

Claim 13, column 14, line 9, after "state of the" insert -- primary --.

Signed and Sealed this
Thirtieth Day of June, 2015

Michelle K. Lee
*Director of the United States Patent and Trademark Office*